US012001407B2

(12) United States Patent
Chibon et al.

(10) Patent No.: US 12,001,407 B2
(45) Date of Patent: Jun. 4, 2024

(54) GENERATING FILESYSTEM IMAGES WITH INTEGRATED CONTAINERS

(71) Applicant: Red Hat, Inc., Raleigh, NC (US)

(72) Inventors: Pierre-Yves Chibon, Paris la Defense (FR); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/717,552

(22) Filed: Apr. 11, 2022

(65) Prior Publication Data

US 2023/0325364 A1 Oct. 12, 2023

(51) Int. Cl.
G06F 16/18 (2019.01)
G06F 16/11 (2019.01)
G06F 16/188 (2019.01)
G06F 16/31 (2019.01)

(52) U.S. Cl.
CPC .......... G06F 16/188 (2019.01); G06F 16/122 (2019.01); G06F 16/1873 (2019.01); G06F 16/322 (2019.01)

(58) Field of Classification Search
CPC .. G06F 16/188; G06F 16/322; G06F 16/1873; G06F 16/122
USPC .......... 707/822, 825, 828, 829, 831
See application file for complete search history.

(56) References Cited

U.S. PATENT DOCUMENTS

| 8,255,362 | B2* | 8/2012 | Johnson | G06F 8/65 707/636 |
| 8,255,363 | B2* | 8/2012 | Johnson | G06F 8/71 717/122 |
| 9,891,907 | B2* | 2/2018 | Searle | H04L 41/082 |
| 10,379,841 | B2 | 8/2019 | Wong et al. | |
| 10,931,746 | B2 | 2/2021 | Scrivano | |
| 2006/0282479 | A1* | 12/2006 | Johnson | G06F 8/65 707/999.203 |
| 2006/0288054 | A1* | 12/2006 | Johnson | G06F 8/61 707/999.203 |
| 2006/0288055 | A1* | 12/2006 | Johnson | G06F 8/60 707/999.203 |
| 2007/0271552 | A1* | 11/2007 | Pulley | G06F 9/453 717/120 |
| 2016/0196132 | A1* | 7/2016 | Searle | G06F 8/65 717/173 |

(Continued)

FOREIGN PATENT DOCUMENTS

CN 112306520 A 2/2021
CN 113239359 A 8/2021

OTHER PUBLICATIONS

Priedhorsky et al., Charliecloud: Unprivileged Containers for User-Defined Software Stacks in HPC: ACM 2017.*

(Continued)

Primary Examiner — Daniel A Kuddus
(74) Attorney, Agent, or Firm — Dority & Manning, P.A.

(57) ABSTRACT

Generating filesystem images with integrated containers is disclosed herein. In one example, a processor device obtains a filesystem tree comprising a plurality of filesystem files, and also obtains a container image comprising a plurality of container files. Based on the filesystem tree and the container image, the processor device generates a filesystem image that comprises the filesystem tree and the plurality of container files. The processor device then stores the filesystem image on a persistent data store.

16 Claims, 6 Drawing Sheets

(56) References Cited

U.S. PATENT DOCUMENTS

| | | | |
|---|---|---|---|
| 2016/0291940 A1* | 10/2016 | Searle | H04L 67/303 |
| 2016/0291959 A1* | 10/2016 | Searle | H04L 41/082 |
| 2016/0294605 A1* | 10/2016 | Searle | H04L 41/069 |
| 2016/0294614 A1* | 10/2016 | Searle | H04L 67/34 |
| 2018/0285165 A1* | 10/2018 | Helsley | G06F 9/5077 |
| 2018/0336021 A1* | 11/2018 | Scrivano | G06F 8/63 |
| 2019/0251190 A1 | 8/2019 | Scrivano | |
| 2019/0294605 A1* | 9/2019 | Bastide | G06F 16/9535 |
| 2020/0145479 A1* | 5/2020 | Scrivano | H04L 67/34 |
| 2020/0274927 A1 | 8/2020 | Richmond et al. | |
| 2021/0097037 A1* | 4/2021 | Babol | G06F 11/1004 |
| 2021/0146950 A1 | 5/2021 | Lee et al. | |

OTHER PUBLICATIONS

Author Unknown, "A Fully Integrated Device Software Update Solution," witekio.com, https://witekio.com/de/blog-de/a-fully-integrated-device-software-update-solution/, accessed online Feb. 22, 2023, 10 pages.

Author Unknown, "SaaS Platform for Connected Cars: ATS Garage Onboard the GLM Electric Roadster," Cision US Inc., https://www.prnewswire.com/news-releases/saas-platform-for-connected-cars-ats-garage-onboard-the-glm-electric-roadster-611511795.html, Jan. 23, 2017, 4 pages.

Author Unknown, "Mercedes-Benz R&D creates 'container-driven cars' powered by Microsoft Azure," Microsoft Corp., https://customers.microsoft.com/en-us/story/784791-mercedes-benz-r-and-d-creates-container-driven-cars-powered-by-microsoft-azure, Mar. 27, 2020, 16 pages.

Author Unknown, "Automotive SIG documentation—Containers in automotive images," The centOS Project, Red Hat, Inc., https://sigs.centos.org/automotive/building/containers/, accessed online Feb. 22, 2023, 2 pages.

Ayres, Nicholas, et al., "Continuous Automotive Software Updates through Container Image Layers," Electronics 2021, 10, 739, https://doi.org/10.3390/electronics10060739, Mar. 20, 2021, 17 pages.

Author Unknown, "OSTree updates and rollback," Apertis, Sep. 15, 2021, https://www.apertis.org/guides/ostree/, 6 pages.

Author Unknown, "System updates and rollback," Apertis, Aug. 4, 2021, https://www.apertis.org/concepts/system-updates and rollback/system-updates-and-rollback.pdf, 31 pages.

Aufranc, Jean-Luc, "Combining OSTree and SW Containers for reliable IoT Device updates," CNX Software—Embedded Systems News, Jun. 7, 2021, https://www.cnx-software.com/2021/06/07/combining-ostree-and-sw-containers-for-reliable-iot-device-updates/, 13 pages.

Breard, B. et al., "RHEL for Edge: update infrastructure quickstart," Red Hat Blog, Jun. 28, 2021, https://www.redhat.com/en/blog/rhel-edge-update-infrastructure-quickstart, 10 pages.

* cited by examiner

GENERATING FILESYSTEM IMAGES WITH INTEGRATED CONTAINERS

BACKGROUND

An image generation system, such as OSTree for Linux-based operating systems, enables the creation of a filesystem image that contains all filesystem files of a bootable filesystem. Using the filesystem image, the bootable filesystem can be easily distributed, atomically updated, and/or replicated on target computing devices. As the range of devices capable of executing such bootable filesystems expands (e.g., to include Systems-on-a-Chip (SoCs), Internet of Things (IoT) devices, and the like), image generation systems with expanded functionality will be desirable.

SUMMARY

The examples disclosed herein provide generating filesystem images with integrated containers. In one example, a processor device executes an image generation service that provides functionality for generating filesystem images that incorporate container images as part of the filesystem tree. In this manner, an underlying operating system as well as a container to be executed thereon may be distributed, updated, and replicated more efficiently.

In another example, a method for generating filesystem images with integrated containers is disclosed. The method comprises obtaining, by a processor device of a computing device, a filesystem tree comprising a plurality of filesystem files. The method further comprises obtaining, by the processor device, a container image comprising a plurality of container files. The method also comprises generating, by the processor device based on the filesystem tree and the container image, a filesystem image comprising the filesystem tree and the plurality of container files. The method additionally comprises storing, by the processor device, the filesystem image on a persistent data store.

In another example, a computing device for generating filesystem images with integrated containers is disclosed. The computing device comprises a system memory, and a processor device communicatively coupled to the system memory. The processor device is to obtain a filesystem tree comprising a plurality of filesystem files. The processor device is further to obtain a container image comprising a plurality of container files. The processor device is also to generate, based on the filesystem tree and the container image, a filesystem image comprising the filesystem tree and the plurality of container files. The processor device is additionally to store the filesystem image on a persistent data store.

In another example, a non-transitory computer-readable medium for generating filesystem images with integrated containers is disclosed. The non-transitory computer-readable medium stores thereon computer-executable instructions that, when executed, cause one or more processor devices to obtain a filesystem tree comprising a plurality of filesystem files. The computer-executable instructions further cause the one or more processor devices to obtain a container image comprising a plurality of container files. The computer-executable instructions also cause the one or more processor devices to generate, based on the filesystem tree and the container image, a filesystem image comprising the filesystem tree and the plurality of container files. The computer-executable instructions additionally cause the one or more processor devices to store the filesystem image on a persistent data store.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
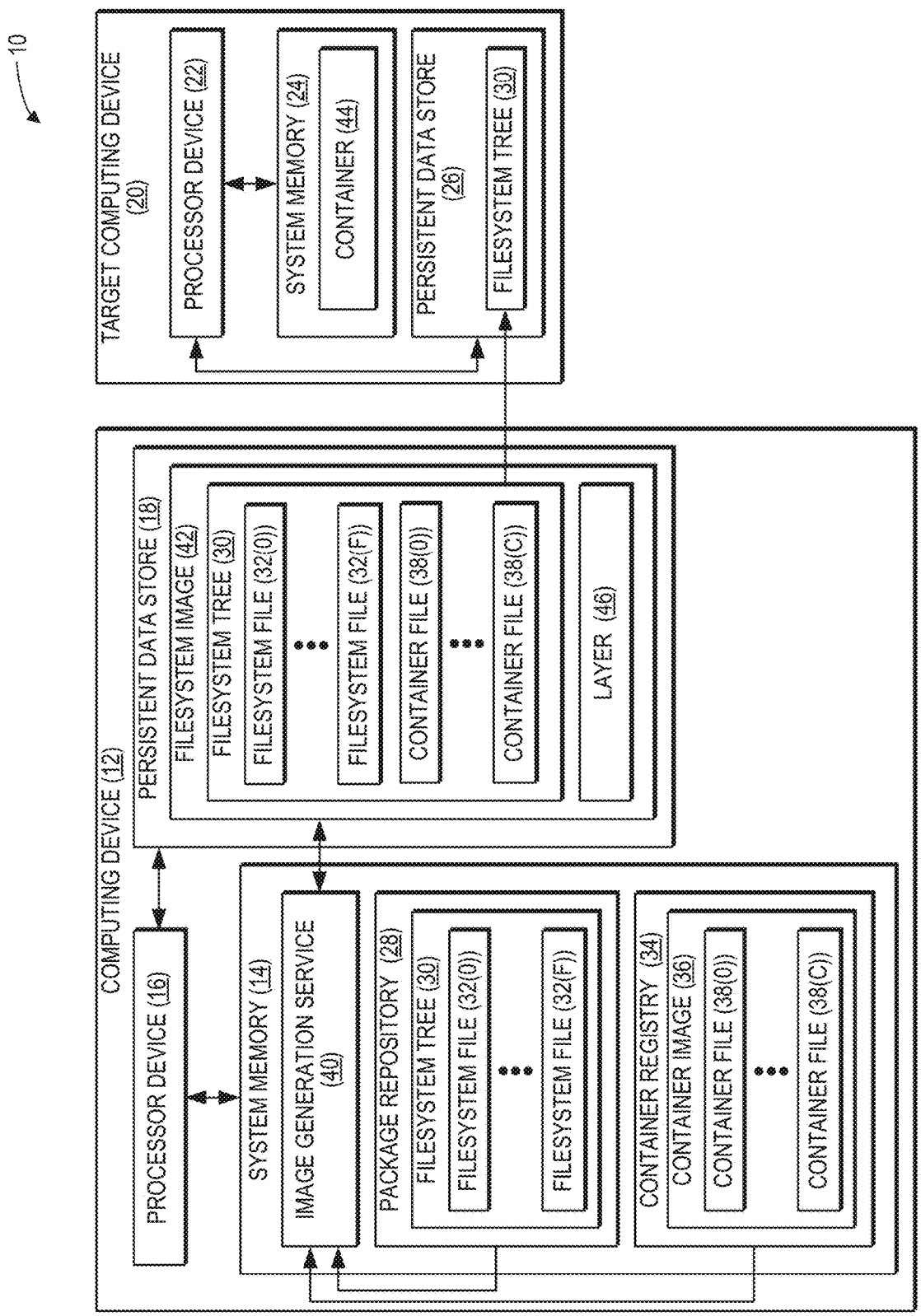
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first container" and "second container," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Conventional image generation systems, such as OSTree for Linux-based operating systems, enable the creation of filesystem images that contain all filesystem files of bootable filesystems. In addition to archiving the filesystem files necessary to operate a bootable filesystem, conventional image generation systems include functionality to ensure that subsequent updates to the filesystem image are performed atomically, and also include functionality to rollback deployment of the filesystem image on a target computing device if the deployment either fails to complete successfully or results in an inoperable system. These image generation systems thus provide a mechanism for reliably distributing, updating, and replicating bootable filesystems.

As the range of devices capable of executing such bootable filesystems expands (e.g., to include Systems-on-a-Chip (SoCs), Internet of Things (IoT) devices, and the like), image generation systems with expanded functionality will be desirable. In particular, the use of container orchestration systems (e.g., Kubernetes, as a non-limiting example) that enable the execution and management of containers (i.e., isolated user-space instances in which applications can be executed) is becoming more widespread as the number of devices capable of executing such container orchestration systems increases. However, conventional image generation systems do not provide functionality for distributing previously defined containers as part of filesystem images.

In this regard, the examples disclosed herein provide generation of filesystem images with integrated containers. In one example, a processor device executes an image generation service that provides functionality for generating filesystem images that incorporate container images as part of the filesystem tree. The functionality of the image generation service may be incorporated into an existing image generation system such as OSTree or may be implemented as a separate system. In exemplary operation, the image generation service obtains a filesystem tree comprising a plurality of filesystem files (i.e., all filesystem files necessary to boot and operate a bootable filesystem). As used herein, the term "filesystem tree" and derivatives thereof are used to refer to the directory structure in which a plurality of filesystem files are organized, as well as the plurality of filesystem files themselves. The filesystem tree in some examples may be obtained from a package file (such as a Red Hat Package Manager (RPM) package file, as a non-limiting example) that the image generation service retrieves from a package repository (using, e.g., an rpm-ostree system and a libdnf package management library, as non-limiting examples).

The image generation service also obtains a container image comprising a plurality of container files that collectively define and provide functionality for a container to be executed under a container orchestration system. According to some examples, the image generation service may obtain the container image from a container registry (e.g., an Open Containers Initiative (OCI)-compliant container registry, as a non-limiting example). The image generation service next generates, based on the filesystem tree and the container image, a filesystem image comprising the filesystem tree and the plurality of container files. The operations for generating the filesystem image in some examples may include incorporating the plurality of container files into the filesystem tree, such that replication of the filesystem tree results in both a bootable filesystem as well as an executable container. Some examples may provide that the filesystem tree is also configured to automatically execute a container based on the plurality of container files upon a subsequent reboot. This may be accomplished by, e.g., modifying a configuration file, folder, or directory within the filesystem tree that defines applications and services to execute the container upon rebooting. The image generation service then stores the filesystem image on a persistent data store (e.g., a hard disk drive (HDD), a solid-state drive (SSD), and/or a cloud-based data store, as non-limiting examples).

In some examples, the image generation service may subsequently atomically deploy the filesystem tree and the plurality of container files to a target computing device using the filesystem image. As used herein, the term "atomically deploy" and derivatives thereof refer to operations for ensuring either that the deployment of the filesystem tree and the plurality of container files is completed successfully, or, in the case of an unsuccessful deployment attempt, that the target computing device is returned to a known-safe state. Some examples may provide that a modification to a container file of the plurality of container files is identified after the filesystem image is stored (e.g., as a result of execution of the corresponding container on the target computing device). The image generation service in such examples may generate a layer indicating the modification to the container file (i.e., by identifying a difference between the original container file and the modified container file) and may modify the filesystem image to include the layer. In this manner, subsequent deployments of the filesystem image will reflect the modification to the container file.

FIG. 1 is a block diagram of a computing system 10 according to one example. The computing system 10 includes a computing device 12 that comprises a system memory 14 and a processor device 16 communicatively coupled to the system memory 14. The computing device 12 further includes a persistent data store 18, which in some examples may comprise an HDD or SSD, as non-limiting examples. The computing system 10 of FIG. 1 also includes a target computing device 20 that includes a processor device 22, a system memory 24, and a persistent data store 26. While the persistent data stores 18 and 26 are illustrated in FIG. 1 as integral elements of the computing device 12 and the target computing device 20, respectively, it is to be understood that some examples may provide that the persistent data store 18 and/or the persistent data store 26 is external to the computing device 12 and the target computing device 20, respectively, and is accessible via a network connection (e.g., a cloud-based data store). It is to be further understood that the computing device 12 and the target computing device 20 in some examples may include constituent elements in addition to those illustrated in FIG. 1.

In the example of FIG. 1, the computing device 12 provides a package repository 28, which may serve as central storage for filesystem archives such as a filesystem tree 30. In some examples, the filesystem tree 30 may be stored as or within a package such as an RPM package. The filesystem tree 30 includes a plurality of filesystem files 32(0)-32(F) that comprise all files needed to boot and operate a bootable filesystem. The filesystem tree 30 also includes a directory tree structure (not shown) that defines the organization of and relationships between the plurality of filesystem files 32(0)-32(F). Although only one filesystem tree 30 is shown in FIG. 1, it is to be understood that the package repository 28 in some examples may store multiple filesystem trees 30.

The computing device 12 of FIG. 1 further provides a container registry 34, which in some examples may comprise an OCI-compliant container registry. The container registry 34 stores container images such as the container image 36, which comprises a plurality of container files 38(0)-38(C) that define a container of a container orchestration system (e.g., Kubernetes, as a non-limiting example). When executed, the container defined by the container files 38(0)-38(C) provides an isolated user-space instance in which applications can be executed and limits the access of such applications to only the resources and devices assigned to that container. It is to be understood that, while the container registry 34 is shown in FIG. 1 as storing only one container image 36, the container registry 34 according to some examples may store multiple container images 36.

As noted above, conventional image generation systems do not provide functionality for distributing previously defined containers as part of filesystem images. Accordingly, in this regard, the processor device 16 executes an image generation service 40, which may be incorporated into an existing image generation system such as OSTree or may be implemented as a separate system. In exemplary operation, the image generation service 40 obtains the filesystem tree 30 comprising the plurality of filesystem files 32(0)-32(F). In some examples, the image generation service 40 may retrieve the filesystem tree 30 in the form of an RPM package from the package repository 28 using conventional package management systems and libraries (e.g., an rpm-ostree system and a libdnf package management library, as non-limiting examples).

The image generation service 40 also obtains the container image 36 comprising the plurality of container files 38(0)-38(C) (e.g., from the container registry 34). Some examples may provide that the mechanism for obtaining the container image 36 may be implemented in a manner analogous to the rpm-ostree system, but employing OCI-based mechanisms for accessing the container registry 34. The image generation service 40 next generates, based on the filesystem tree 30 and the container image 36, a filesystem image 42 that includes the filesystem tree 30 and the plurality of container files 38(0)-38(C). In some examples, the image generation service 40 may generate the filesystem image 42 by incorporating the plurality of container files 38(0)-38(C) into the filesystem tree 30 (i.e., based on the metadata provided by the container image 36) such that replication of the filesystem tree 30 results in both a bootable filesystem as well as an executable container.

Some examples may provide that the image generation service 40 also configures the filesystem tree 30 to automatically execute a container based on the plurality of container files 38(0)-38(C) upon a subsequent reboot. This may be accomplished by, e.g., modifying a configuration file, folder, or directory within the filesystem tree 30 that defines applications and services to execute upon rebooting. The image generation service 40 then stores the filesystem image 42 on the persistent data store 18.

The image generation service 40 in some examples may subsequently atomically deploy the filesystem tree 30 and the plurality of container files 38(0)-38(C) to the target computing device 20 using the filesystem image 42. As seen in FIG. 1, deploying the filesystem tree 30 may comprise writing the filesystem tree 30 to the persistent data store 26 of the target computing device 20. Upon rebooting the target computing device 20, the filesystem tree 30 provides a bootable filesystem for the target computing device 20 and also provides the files to execute a container 44 on the target computing device 20.

Some examples may provide that a modification to a container file, such as the container file 38(0) of the plurality of container files 38(0)-38(C), is identified after the filesystem image 42 is stored (e.g., as a result of execution of the corresponding container 44 on the target computing device 20). The image generation service 40 in such examples may generate a layer 46 indicating the modification to the container file 38(0). The layer 46 in some examples may comprise an identification of a difference between the original container file 38(0) and the modified container file 38(0). The image generation service 40 may then modify the filesystem image 42 to include the layer 46. In this manner, subsequent deployments of the filesystem image 42 will reflect the modification to the container file 38(0).

It is to be understood that, because the image generation service 40 is a component of the computing device 12, functionality implemented by the image generation service 40 may be attributed to the computing system 10 generally. Moreover, in examples where the image generation service 40 comprises software instructions that program the processor device 16 to carry out functionality discussed herein, functionality implemented by the image generation service 40 may be attributed herein to the processor device 16. It is to be further understood that while, for purposes of illustration only, the image generation service 40 is depicted as a single component, the functionality implemented by the image generation service 40 may be implemented in any number of components, and the examples discussed herein are not limited to any particular number of components. Additionally, it is noted that while, for purposes of illustration and simplicity, the examples are illustrated as being implemented by a processor device set that includes a single processor device on a single computing device, in other environments, such as a distributed and/or clustered environment, the examples may be implemented on a computer system that includes a processor device set that includes a plurality of processor devices of a plurality of different computing devices, and functionality of the examples may be implemented on different processor devices of different computing devices. Thus, irrespective of the implementation, the examples may be implemented on a computer system that includes a processor device set made up of one or more processor devices of one or more computing devices.

Figure 2A:
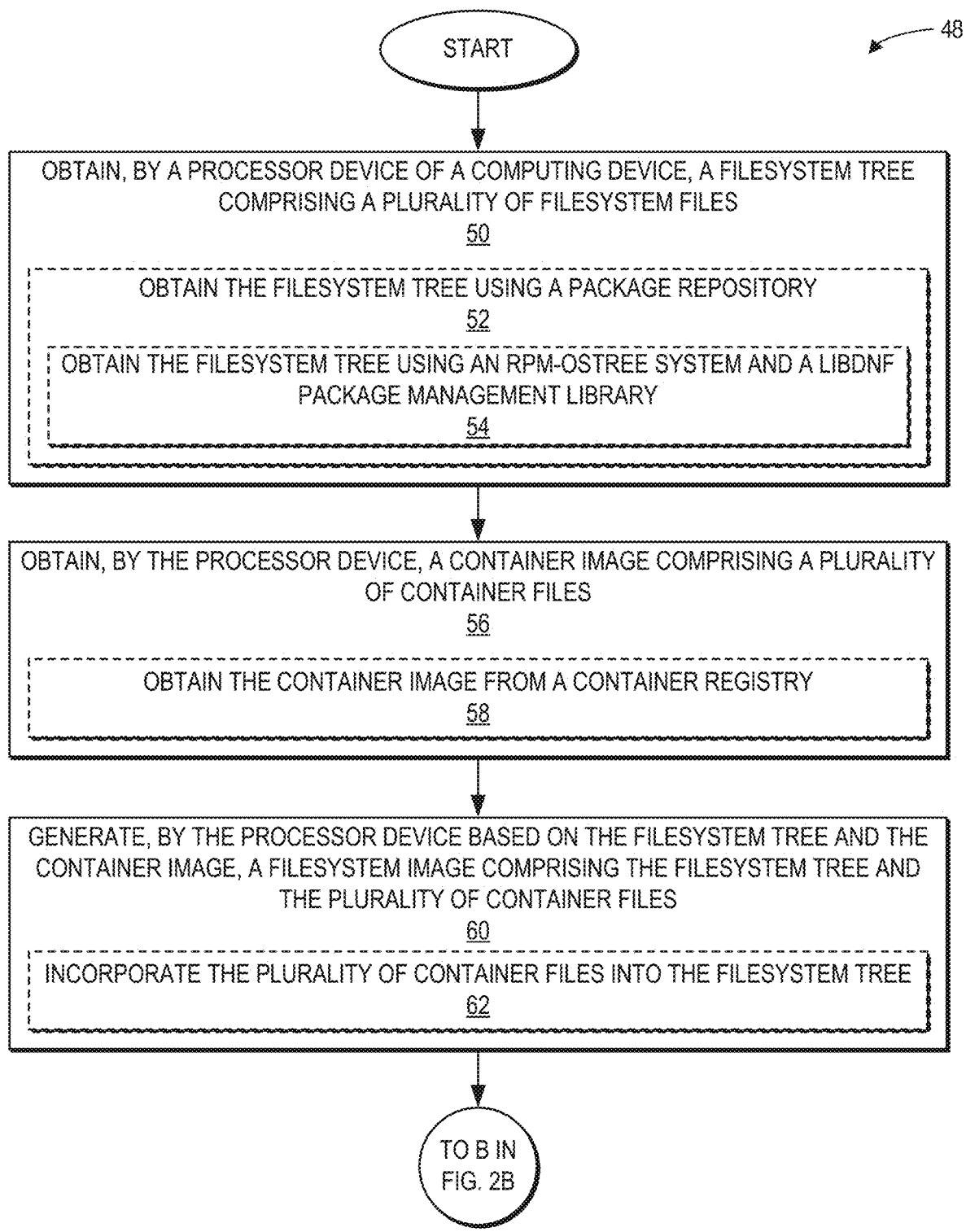
FIGS. 2A and 2B are flowcharts illustrating operations performed by the computing system of FIG. 1 for generating filesystem images with integrated containers, according to one example.
Figure 2B:
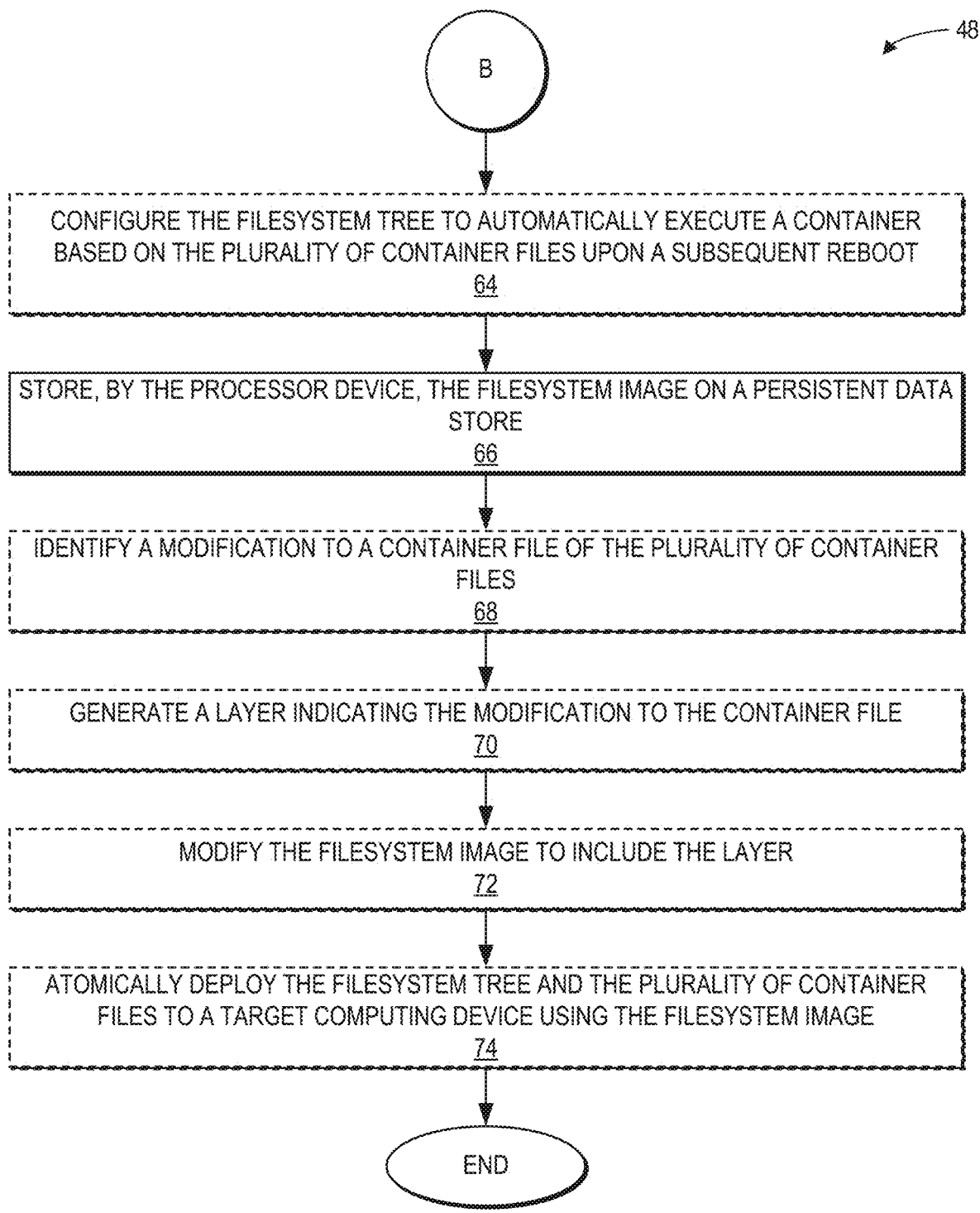

FIGS. 2A and 2B provide a flowchart 48 to illustrate exemplary operations performed by the computing system 10 of FIG. 1 for generating filesystem images with integrated containers according to one example. Elements of FIG. 1 are referenced in describing FIGS. 2A and 2B for the sake of clarity. It is to be understood that, in some examples, some operations illustrated in FIGS. 2A and 2B may be performed in an order other than illustrated herein, and/or may be omitted. In FIG. 2A, operations with the processor device 16 of FIG. 1 (e.g., by executing the image generation service of FIG. 1) obtaining a filesystem tree (e.g., the filesystem tree 30 of FIG. 1) comprising a plurality of filesystem files (e.g., the plurality of filesystem files 32(0)-32(F) of FIG. 1) (block 50). In some examples, the operations of block 50 for obtaining the filesystem tree 30 may comprise obtaining the filesystem tree using a package repository such as the package repository 28 of FIG. 1 (block 52). Some examples may provide that the operations of block 52 for obtaining the filesystem tree 30 using the package repository 28 may comprise obtaining the filesystem tree 30 using an rpm-ostree system and a libdnf package management library (block 54).

The image generation service 40 also obtains a container image (e.g., the container image 36 of FIG. 1) comprising a plurality of container files (e.g., the plurality of container files 38(0)-38(C) of FIG. 1) (block 56). According to some examples, the operations of block 56 for obtaining the container image 36 may comprise obtaining the container image 36 from a container registry such as the container registry 34 of FIG. 1 (block 58). The image generation service 40 then generates, based on the filesystem tree 30 and the container image 36, a filesystem image (e.g., the filesystem image 42 of FIG. 1) comprising the filesystem tree 30 and the plurality of container files 38(0)-38(C) (block 60). In some examples, the operations of block 60 for generating the filesystem image 42 may comprise the image generation service 40 incorporating the plurality of container files 38(0)-38(C) into the filesystem tree 30 (block 62). Operations in some examples may then continue at block 64 of FIG. 2B.

Referring now to FIG. 2B, some examples may provide that the image generation service 40 configures the filesystem tree 30 to automatically execute a container (e.g., the container 44 of FIG. 1) based on the plurality of container files 38(0)-38(C) upon a subsequent reboot (block 64). The image generation service 40 then stores the filesystem image 42 on a persistent data store 18 (block 66).

According to some examples, the image generation service 40 may subsequently identify a modification to a container file (e.g., the container file 38(0) of FIG. 1) of the plurality of container files 38(0)-38(C) (block 68). The image generation service 40 may next generate a layer (e.g., the layer 46 of FIG. 1) indicating the modification to the container file 38(0) (block 70). The image generation service 40 may then modify the filesystem image 42 to include the layer 46 (block 72). In some examples, the image generation service 40 may atomically deploy the filesystem tree 30 and the plurality of container files 38(0)-38(C) to a target computing device (e.g., the target computing device 20 of FIG. 1) using the filesystem image 42 (block 74).

Figure 3:
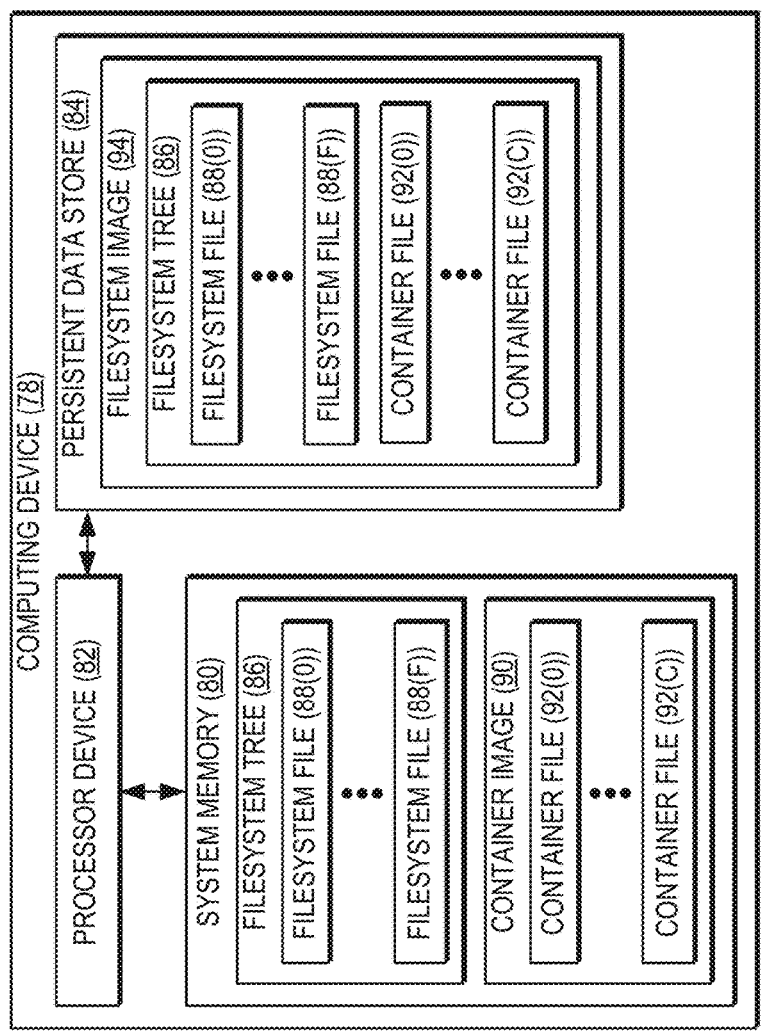
FIG. 3 is a simpler block diagram of the computing system of FIG. 1 for generating filesystem images with integrated containers, according to one example.

FIG. 3 is a simpler block diagram of the computing system 10 of FIG. 1 for generating filesystem images with integrated containers, according to one example. The computing system 76 of FIG. 3 includes a computing device 78 that comprises a system memory 80 and a processor device 82 communicatively coupled to the system memory 80. The computing device 78 further includes a persistent data store 84. In exemplary operation, the processor device 82 obtains a filesystem tree 86 comprising a plurality of filesystem files 88(0)-88(F). The processor device 82 also obtains a container image 90 comprising a plurality of container files 92(0)-92(C). The processor device 82 next generates, based on the filesystem tree 86 and the container image 90, a filesystem image 94 that includes the filesystem tree 86 and the plurality of container files 92(0)-92(C). The processor device 82 then stores the filesystem image 94 on the persistent data store 84.

Figure 4:
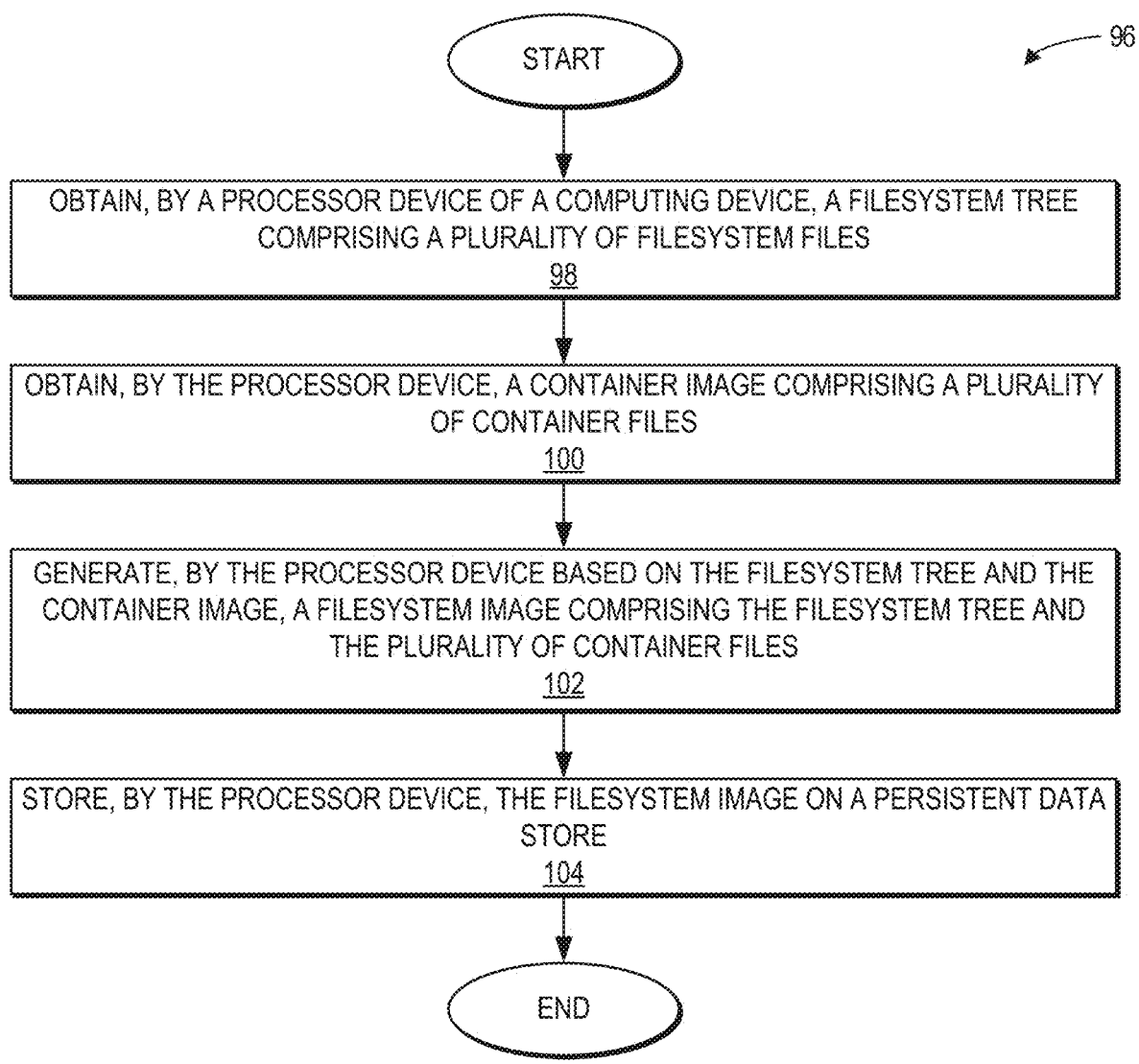
FIG. 4 is a flowchart of a simplified method for generating filesystem images with integrated containers by the computing device of FIG. 3, according to one example.

To illustrate a simplified method for generating filesystem images with integrated containers in the computing system 76 of FIG. 3 according to one example, FIG. 4 provides a flowchart 96. Elements of FIG. 3 are referenced in describing FIG. 4 for the sake of clarity. In FIG. 4, operations begin with the processor device 82 of the computing device 78 obtaining the filesystem tree 86 comprising the plurality of filesystem files 88(0)-88(F) (block 98). The processor device 82 also obtains a container image 90 comprising a plurality of container files 92(0)-92(C) (block 100). The processor device 82 generates, based on the filesystem tree 86 and the container image 90, the filesystem image 94 comprising the filesystem tree 86 and the plurality of container files 92(0)-92(C) (block 102). The processor device 82 then stores the filesystem image 94 on the persistent data store 84 (block 104).

Figure 5:
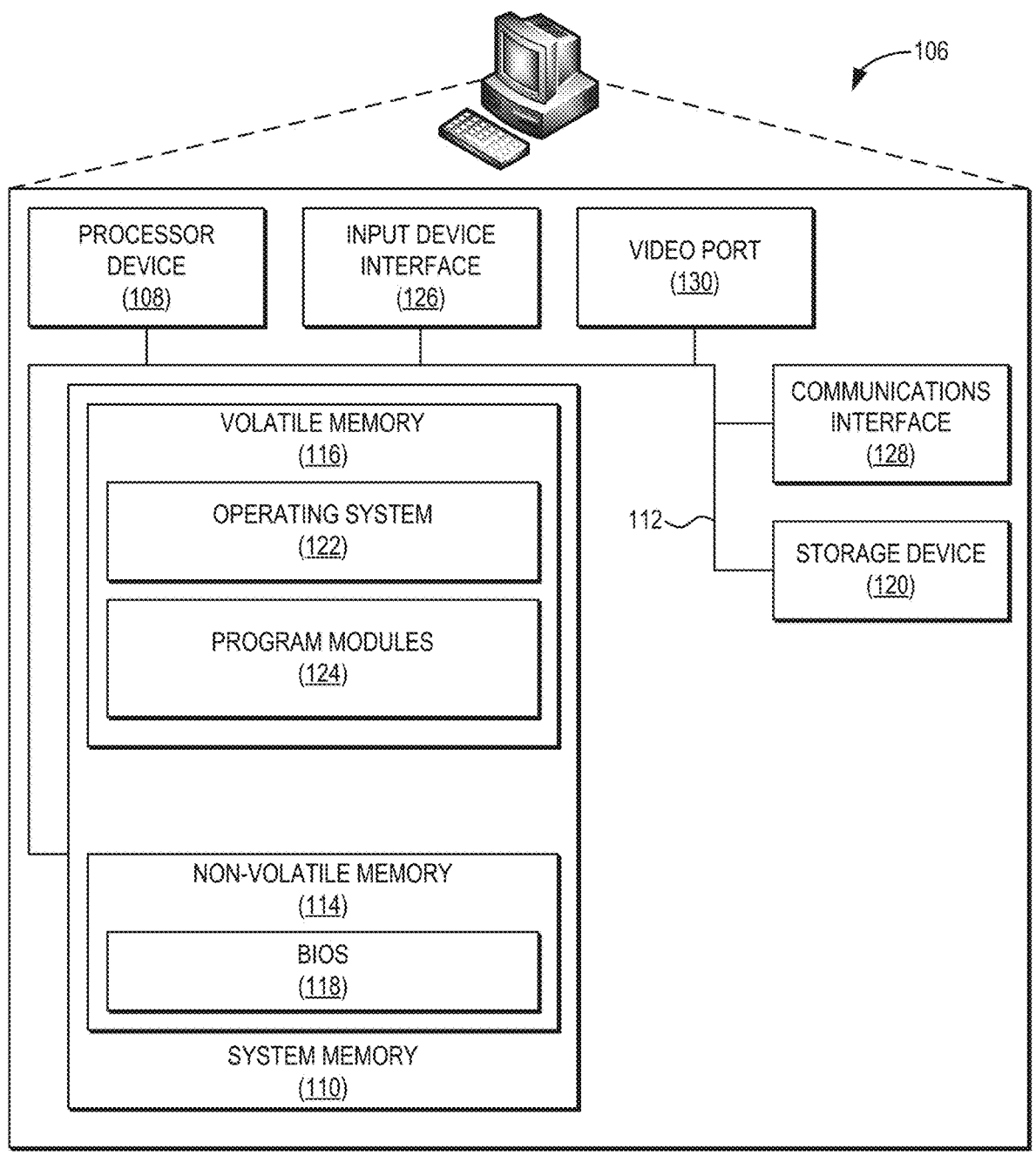
FIG. 5 is a block diagram of a computing device suitable for implementing examples, according to one example.

FIG. 5 is a block diagram of a processor-based computing device 106 ("computing device 106"), such as the computing device 12 of FIG. 1 in some examples, suitable for implementing examples according to one example. The computing device 106 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 106 includes a processor device 108, a system memory 110, and a system bus 112. The system bus 112 provides an interface for system components including, but not limited to, the system memory 110 and the processor device 108. The processor device 108 can be any commercially available or proprietary processor.

The system bus 112 may be any of several types of bus structures that may further interconnect to a memory bus (with or without a memory controller), a peripheral bus, and/or a local bus using any of a variety of commercially available bus architectures. The system memory 110 may include non-volatile memory 114 (e.g., read-only memory (ROM), erasable programmable ROM (EPROM), electrically EPROM (EEPROM), etc.), and volatile memory 116 (e.g., RAM). A basic input/output system (BIOS) 118 may be stored in the non-volatile memory 114 and can include the basic routines that help to transfer information among elements within the computing device 106. The volatile memory 116 may also include a high-speed RAM, such as static RAM, for caching data.

The computing device 106 may further include or be coupled to a non-transitory computer-readable storage medium such as a storage device 120, which may comprise, for example, an internal or external hard disk drive (HDD) (e.g., enhanced integrated drive electronics (EIDE) or serial advanced technology attachment (SATA)), for storage, flash memory, or the like. The storage device 120 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 120 and in the volatile memory 116, including an operating system 122 and one or more program modules 124 (e.g., the image generation service 40 of FIG. 1) which may implement the functionality described herein in whole or in part. It is to be appreciated that the examples can be implemented with various commercially available operating systems 122 or combinations of operating systems 122. All or a portion of the examples may be implemented as a computer program product stored on a transitory or non-transitory computer-usable or computer-readable storage medium, such as the storage device 120, which includes complex programming instructions, such as complex computer-readable program code, to cause the processor device 108 to carry out the steps described herein. Thus, the computer-readable program code can comprise software instructions for implementing the functionality of the examples described herein when executed on the processor device 108. The processor device 108 may serve as a controller, or control system, for the computing device 106 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 108 through an input device interface 126 that is coupled to the system bus 112 but can be connected by other interfaces, such as a parallel port, an Institute of Electrical and Electronic Engineers (IEEE) 1394 serial port, a Universal Serial Bus (USB) port, an IR interface, and the like.

The computing device 106 may also include a communications interface 128 suitable for communicating with a network as appropriate or desired. The computing device 106 may also include a video port 130 to interface with a display device to provide information to a user.

Individuals will recognize improvements and modifications to the preferred examples of the disclosure. All such improvements and modifications are considered within the scope of the concepts disclosed herein and the claims that follow.

What is claimed is:

1. A method, comprising:
    obtaining, by a processor device of a computing device, a filesystem tree comprising a plurality of filesystem files;
    obtaining, by the processor device, a container image comprising a plurality of container files;
    generating, by the processor device based on the filesystem tree and the container image, a bootable filesystem image comprising the filesystem tree and the plurality of container files, wherein generating the bootable filesystem image comprises incorporating the plurality of container files into the filesystem tree based on metadata included in the container image;
    configuring, by the processor device, the filesystem tree in the bootable filesystem image to automatically execute a container based on the plurality of container files in the bootable filesystem image upon a reboot from the bootable filesystem image;
    storing, by the processor device, the bootable filesystem image on a persistent data store;
    deploying, by the processor device, the bootable filesystem image to a target computing device; and
    causing, by the processor device, the target computing device to reboot from the bootable filesystem image to execute the container.

2. The method of claim 1, wherein obtaining the filesystem tree comprises obtaining the filesystem tree using a package repository.

3. The method of claim 2, wherein obtaining the filesystem tree using the package repository comprises obtaining the filesystem tree using an rpm-ostree system and a libdnf package management library.

4. The method of claim 1, wherein obtaining the container image comprises obtaining the container image from a container registry.

5. The method of claim 4, wherein the container registry comprises an Open Containers Initiative (OCI)-compliant container registry.

6. The method of claim 1, further comprising, subsequent to storing the bootable filesystem image:
    identifying a modification to a container file of the plurality of container files;
    generating a layer indicating the modification to the container file; and
    modifying the bootable filesystem image to include the layer.

7. The method of claim 1, wherein deploying the bootable filesystem image to the target computing device comprises atomically deploying the filesystem tree and the plurality of container files to the target computing device using the bootable filesystem image.

8. A computing device, comprising:
    a system memory; and
    a processor device communicatively coupled to the system memory, the processor device to:
        obtain a filesystem tree comprising a plurality of filesystem files;
        obtain a container image comprising a plurality of container files;
        generate, based on the filesystem tree and the container image, a bootable filesystem image comprising the filesystem tree and the plurality of container files, wherein to generate the bootable filesystem image is to incorporate the plurality of container files into the filesystem tree based on metadata included in the container image;
        configure the filesystem tree in the bootable filesystem image to automatically execute a container based on the plurality of container files in the bootable filesystem image upon a reboot from the bootable filesystem image;
        store the bootable filesystem image on a persistent data store;
        deploy the bootable filesystem image to a target computing device; and
        cause the target computing device to reboot from the bootable filesystem image to execute the container.

9. The computing device of claim 8, wherein to obtain the filesystem tree is to obtain the filesystem tree using a package repository.

10. The computing device of claim 9, wherein to obtain the filesystem tree using the package repository is to obtain the filesystem tree using an rpm-ostree system and a libdnf package management library.

11. The computing device of claim 8, wherein to obtain the container image is to obtain the container image from a container registry.

12. The computing device of claim 11, wherein the container registry comprises an Open Containers Initiative (OCI)-compliant container registry.

13. The computing device of claim 8, wherein the processor device is further to, subsequent to storing the bootable filesystem image:
    identify a modification to a container file of the plurality of container files;
    generate a layer indicating the modification to the container file; and
    modify the bootable filesystem image to include the layer.

14. The computing device of claim 8, wherein, to deploy the bootable filesystem image to the target computing device, the processor device is further to atomically deploy the filesystem tree and the plurality of container files to the target computing device using the bootable filesystem image.

15. A non-transitory computer-readable medium having stored thereon computer-executable instructions that, when executed, cause one or more processor devices to:
    obtain a filesystem tree comprising a plurality of filesystem files;
    obtain a container image comprising a plurality of container files;
    generate, based on the filesystem tree and the container image, a bootable filesystem image comprising the filesystem tree and the plurality of container files, wherein to generate the bootable filesystem image is to incorporate the plurality of container files into the filesystem tree based on metadata included in the container image;
    configure the filesystem tree in the bootable filesystem image to automatically execute a container based on the plurality of container files in the bootable filesystem image upon a reboot from the bootable filesystem image;
    store the bootable filesystem image on a persistent data store;

deploy the bootable filesystem image to a target computing device; and cause the target computing device to reboot from the bootable filesystem image to execute the container.

16. The non-transitory computer-readable medium of claim 15, wherein the computer-executable instructions further cause the one or more processor devices to:

identify a modification to a container file of the plurality of container files;

generate a layer indicating the modification to the container file; and modify the bootable filesystem image to include the layer.

\* \* \* \* \*